(12) United States Patent
Hagenlocher et al.

(10) Patent No.: US 10,940,865 B2
(45) Date of Patent: Mar. 9, 2021

(54) METHOD AND DEVICE FOR DETERMINING A STATE OF A ROADWAY OF A VEHICLE

(71) Applicant: Robert Bosch GmbH, Stuttgart (DE)

(72) Inventors: Nils Hagenlocher, Stuttgart (DE); Tobias Oberhardt, Erlenbach (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 16/157,512

(22) Filed: Oct. 11, 2018

(65) Prior Publication Data
US 2019/0118822 A1 Apr. 25, 2019

(30) Foreign Application Priority Data
Oct. 25, 2017 (DE) .......................... 10 2017 219 048

(51) Int. Cl.
*B60W 40/068* (2012.01)
(52) U.S. Cl.
CPC ....... *B60W 40/068* (2013.01); *B60W 2520/26* (2013.01)
(58) Field of Classification Search
CPC ......................... B60W 40/068; B60W 2520/26
USPC ........................................................... 701/82
See application file for complete search history.

(56) References Cited

U.S. PATENT DOCUMENTS

| | | | | |
|---|---|---|---|---|
| 5,570,935 A | * | 11/1996 | Monzaki | B60T 8/17616 303/155 |
| 5,588,721 A | * | 12/1996 | Asano | B60T 8/173 303/163 |
| 5,869,753 A | * | 2/1999 | Asanuma | B60T 8/172 701/72 |

(Continued)

FOREIGN PATENT DOCUMENTS

| | | | | |
|---|---|---|---|---|
| EP | 1219515 A1 | * | 7/2002 | ........... B60G 17/019 |
| EP | 2915692 A1 | * | 9/2015 | ............. B60T 8/175 |

(Continued)

OTHER PUBLICATIONS

Mingyuan et al., "Estimation of Maximum Tire-Road Friction Based on Dynamic Model Reconstruction," 2013, Publisher: IEEE.*

(Continued)

*Primary Examiner* — Tuan C To
(74) *Attorney, Agent, or Firm* — Norton Rose Fulbright US LLP; Gerard Messina

(57) ABSTRACT

A method for determining a state of a roadway of a vehicle. A first distance value of a measurement coordinate to a first tire characteristic curve associated with a first state of the roadway is ascertained. A second distance value of the measurement coordinate to a second tire characteristic curve associated with a second state of the roadway is ascertained. The measurement coordinate represents a measurement carried out using at least one vehicle sensor of a presently utilized traction between wheels of the vehicle and the roadway and a wheel slip of the wheels, while the first tire (Continued)

characteristic curve and the second tire characteristic curve are based on a model function for the modeled representation of the traction as a function of the wheel slip. An output signal representing the state of the roadway is output using the first distance value and the second distance value.

13 Claims, 4 Drawing Sheets

(56) References Cited

U.S. PATENT DOCUMENTS

| | | | | |
|---|---|---|---|---|
| 6,208,920 | B1* | 3/2001 | Izawa | B60G 17/016 |
| | | | | 280/5.5 |
| 6,505,506 | B1* | 1/2003 | Hellweg | B29C 59/14 |
| | | | | 180/271 |
| 6,954,690 | B2* | 10/2005 | Watanabe | B60T 8/1755 |
| | | | | 180/271 |
| 8,666,562 | B2* | 3/2014 | Tuononen | B60T 8/172 |
| | | | | 701/1 |
| 2002/0189336 | A1* | 12/2002 | McEwan | G01M 17/027 |
| | | | | 73/146 |
| 2003/0144777 | A1* | 7/2003 | Schmitt | B60T 8/1725 |
| | | | | 701/31.4 |
| 2005/0038589 | A1* | 2/2005 | Shukla | B60T 8/172 |
| | | | | 701/80 |
| 2010/0114449 | A1* | 5/2010 | Shiozawa | B60W 40/101 |
| | | | | 701/90 |
| 2011/0295457 | A1* | 12/2011 | Linda | B60W 40/068 |
| | | | | 701/498 |
| 2012/0271504 | A1* | 10/2012 | Reiners | E02F 9/261 |
| | | | | 701/29.1 |
| 2014/0188363 | A1* | 7/2014 | Eckert | B60T 8/266 |
| | | | | 701/70 |
| 2015/0166072 | A1* | 6/2015 | Powers | G08G 1/0129 |
| | | | | 701/1 |
| 2015/0266487 | A1* | 9/2015 | Kato | B60W 40/13 |
| | | | | 701/22 |
| 2015/0285712 | A1* | 10/2015 | Singh | G01N 3/56 |
| | | | | 73/8 |
| 2016/0167662 | A1* | 6/2016 | Kobayashi | B60W 30/18172 |
| | | | | 701/90 |
| 2016/0178802 | A1* | 6/2016 | Stainvas Olshansky | |
| | | | | G01N 21/4738 |
| | | | | 356/341 |
| 2016/0250930 | A1* | 9/2016 | Collins | B60L 3/106 |
| | | | | 701/22 |
| 2017/0080926 | A1* | 3/2017 | Mogi | B60W 30/02 |
| 2017/0161570 | A1* | 6/2017 | Zhao | G06K 9/00791 |
| 2017/0162045 | A1* | 6/2017 | Zhao | B60R 16/0237 |
| 2018/0105151 | A1* | 4/2018 | Gustafsson | B60W 40/068 |

FOREIGN PATENT DOCUMENTS

| | | | | |
|---|---|---|---|---|
| EP | 3106360 A1 | * | 12/2016 | B60W 40/068 |
| GB | 2531327 A | * | 4/2016 | B60W 10/184 |
| JP | H075041 B2 | * | 1/1995 | |
| WO | WO-0149540 A1 | * | 7/2001 | B60T 8/172 |
| WO | WO-0198123 A1 | * | 12/2001 | B60C 23/06 |

OTHER PUBLICATIONS

M. Tanelli et al., "Real-Time Identification of Tire-Road Friction Conditions," 2009, vol. 3, Publisher: IET.*

* cited by examiner

METHOD AND DEVICE FOR DETERMINING A STATE OF A ROADWAY OF A VEHICLE

CROSS REFERENCE

The present application claims the benefit under 35 U.S.C. § 119 of German Patent Application No. DE 102017219048.5 filed on Oct. 25, 2018, which is expressly incorporated herein by reference in its entirety.

BACKGROUND INFORMATION

The present invention relates to a method and a device for determining a state of a roadway of a vehicle. The present invention also relates to a computer program.

In future highly automated functions, a vehicle is to be able to manage itself in critical situations independently under certain circumstances even without the assistance of the driver. Therefore, the vehicle is ideally to preventively avoid critical situations. The topic of networking of vehicles plays an important role here. Networked vehicles could be accompanied by already significant improvements of the driving comfort and the driving safety by way of prevention and prediction of events and states.

In motor vehicles, a presently available traction potential may be estimated with the aid of the existing sensors and the existing models from the ESP system and the steering systems. The utilized friction coefficients may be ascertained by friction coefficient estimators during acceleration or deceleration. The existing friction coefficient may be ascertained exactly during an active control intervention of certain safety systems such as ABS, TCS, ESP, or EPS. In the case of free rolling, i.e., without acceleration or deceleration, in contrast, a road friction coefficient cannot be estimated.

SUMMARY

In accordance with the present invention, a method is provided for determining a state of a tire-roadway contact, a device is provided which uses this method, and a corresponding computer program is provided. Advantageous refinements and improvements of the device are described herein.

A method is provided for determining a state of a roadway of a vehicle, the method including the following steps:

Ascertaining a distance of a measurement coordinate to a first tire characteristic curve associated with a first state of the roadway in order to generate a first distance value, and to a second tire characteristic curve associated with a second state of the roadway in order to generate a second distance value, the measurement coordinate representing a result of a measurement carried out using at least one vehicle sensor of a presently utilized traction between wheels of the vehicle and the roadway and a wheel slip of the wheels and the first tire characteristic curve and the second tire characteristic curve being based on a model function for the modeled representation of the traction as a function of the wheel slip; and outputting an output signal representing the state of the roadway using the first distance value and the second distance value.

A state of the roadway may be understood, for example, as a type of a pavement, for example, cobblestones or asphalt or a wet or dry roadway or in general a category for estimating a traction potential of the roadway, such as low, moderate, or high traction potential. A measurement coordinate may be understood as a value pair of measured values or values of the traction and the wheel slip derived from measured values. The measurement coordinate may advantageously be a mean value formed using the measured values. Traction may be understood as a friction coefficient $\mu$. Wheel slip may be understood as the difference of a wheel velocity and a vehicle velocity in relation to a vehicle velocity. In particular, wheel slip may be understood as a wheel longitudinal slip. The first or second distance value may represent, for example, a perpendicular, i.e., least distance of the measurement coordinate to the first or second tire characteristic curve. A tire characteristic curve may be understood as a curve ascertained on the basis of a tire model specified by a tire manufacturer, for example, to represent a dependence of the traction on the wheel slip in the case of a specific state of the roadway. A model function may be understood, for example, as a function based on the so-called Burckhardt model. In particular, the model function may be a linearly parameterized function. A signal provided by the vehicle sensor may be understood, for example, as a signal provided by an acceleration, pressure, steering angle, or surroundings sensor of the vehicle. The output signal may represent, for example, the first or second distance value or a probability of a certain state of the roadway.

In accordance with the present invention, a road state classification may be carried out by determining a distance of value pairs of a measured traction and a measured wheel slip to at least two predefined tire characteristic curves each representing another road state. The tire characteristic curves represent tire models for this purpose, which describe a relationship between traction and wheel slip by modeling.

Inter alia, the approach presented here enables a classification of the road state on the basis of estimations of an instantaneous traction $\mu$ and an existing wheel slip $\lambda$ in the slip range from 0 to 15% with the aid of an existing ESP sensor system of the vehicle. Such a method has the advantage that the road state classification may be carried out with comparatively little computing effort and nonetheless high reliability.

According to one specific embodiment, in the step of ascertaining, a coordinate may be used as the measurement coordinate which represents a mean value of measured values of the measurement or, additionally or alternatively, a wheel slip of at most 15%. The accuracy of the method may thus be enhanced. Moreover, a slip-based road state classification may thus be carried out.

According to another specific embodiment, in the step of ascertaining, a least distance of the measurement coordinate to the first tire characteristic curve may be ascertained to generate the first distance value. Additionally or alternatively, a least distance of the measurement coordinate to the second tire characteristic curve may be ascertained to generate the second distance value. The distance of the measurement coordinate may thus be ascertained with little computing effort.

It is advantageous if, in the step of outputting, a signal representing the first state of the roadway is output as the output signal if the first distance value is less than the second distance value. A probability may thus be determined by a simple distance comparison, by which the state of the roadway corresponds to either the first state or the second state.

According to another specific embodiment, in a step of determining, a maximum value representing a maximum traction may be determined using the output signal in combination with the first tire characteristic curve or the second tire characteristic curve. The levels of the maximum traction potentials differ depending on the underlying surface. A tire on wet cobblestones has a maximum potential of approximately 0.4, the maximum traction potential of a tire on dry asphalt is 1.0, for example.

Moreover, it is advantageous if, in a step of plausibility checking, the output signal is checked for plausibility using at least one piece of additional information relevant for the determination of the state of the roadway. In this case, in a step of modifying, the first tire characteristic curve may be modified to form a modified first tire characteristic curve depending on a result of the plausibility check. Similarly thereto, in the step of modifying, the second tire characteristic curve may additionally or alternatively be modified to form a modified second tire characteristic curve. The piece of additional information may be, for example, a piece of weather information, a piece of information with respect to an aging or wear process of the tire of the vehicle, a velocity of a windshield wiper of the vehicle, or values of other measured variables suitable for determining the state of the roadway. The tire model parameters used to determine the state of the roadway may be continuously updated by this specific embodiment. The accuracy of the method may thus be significantly enhanced.

According to another specific embodiment, the step of ascertaining may be carried out again to generate the first distance value by ascertaining a distance of the measurement coordinate to the modified first tire characteristic curve or, additionally or alternatively, to generate the second distance value by ascertaining a distance of the measurement coordinate to the modified second tire characteristic curve. The state of the roadway may thus be particularly reliably determined using continuously updated tire model parameters.

Furthermore, in the step of ascertaining, a characteristic curve may be used as the first tire characteristic curve and/or the second tire characteristic curve which is based on a model function for the modeled representation of the traction as a function of tire model parameters and/or tire model parameters of the linearly parameterized model function of the wheels. A preferably realistic image of the traction may thus be ensured.

It is particularly advantageous if, in the step of ascertaining, a characteristic curve is used as the first tire characteristic curve and/or the second tire characteristic curve which represents a linear parameterization of the following model function:

$$\mu(\lambda,\underline{c}) = c_1(1 - e^{-c_2\lambda}) - c_3\lambda,$$

μ standing for the traction,
λ standing for the wheel slip,
$c_1, c_2, c_3$ standing for the tire model parameters.

A reliable real-time estimation of the state of the roadway is thus enabled.

In particular, in the step of ascertaining, a characteristic curve may be used as the first tire characteristic curve and/or the second tire characteristic curve which represents a model function linearly parameterized using the following function:

$$\mu(\lambda,\underline{\omega}) = \omega_1(1 - e^{-8.105\lambda}) + \omega_2(1 - e^{-27.547\lambda}) + \omega_3(1 - e^{-75.012\lambda}) - \omega_4\lambda,$$

μ standing for the traction,
λ standing for the wheel slip,
$\omega_1, \omega_2, \omega_3, \omega_4$ standing for the tire model parameters of the linearly parameterized model function.

A real-time estimation which is particularly suitable with respect to a road state classification may be ensured by this specific embodiment.

According to another specific embodiment, in the step of ascertaining, a distance of the measurement coordinate to at least one further tire characteristic curve, which is associated with the further state of the roadway and is based on the model function, may be ascertained to generate at least one further distance value. In the step of outputting, the output signal may be output using the further distance value. The state of the roadway may thus be determined using a plurality of tire characteristic curves. A plurality of different states of the roadway may thus be reliably recognized.

This method may be implemented, for example, in software or hardware or in a mixed form of software and hardware, for example, in a control unit.

The present invention furthermore provides a device which is designed to carry out, actuate, and/or implement the steps of a variant of a method provided here in corresponding units. The object on which the present invention is based may also be achieved rapidly and efficiently by this embodiment variant of the present invention in the form of a device.

For this purpose, the device may include at least one processing unit for processing signals or data, at least one memory unit for storing signals or data, at least one interface to a sensor or an actuator for inputting sensor signals from the sensor or for outputting data or control signals to the actuator, and/or at least one communication interface for inputting or outputting data, which are embedded in a communication protocol. The processing unit may be, for example, a signal processor, a microcontroller, or the like; the memory unit may be a flash memory, an EPROM, or a magnetic memory unit. The communication interface may be designed to input or output data in a wireless and/or wired manner, a communication interface which may input or output wired data being able to input these data, for example, electrically or optically from a corresponding data transmission line or output them into a corresponding data transmission line.

A device may be understood in the present case as an electrical device, which processes sensor signals and outputs control and/or data signals as a function thereof. The device may include an interface, which may be in the form of hardware and/or software. In the case of a hardware design, the interfaces may be, for example, part of a so-called system ASIC, which includes greatly varying functions of the device. However, it is also possible that the interfaces are separate integrated circuits or are at least partially made up of discrete components. In the case of a software design, the interfaces may be software modules, which are present in addition to other software modules on a microcontroller, for example.

In one advantageous embodiment, a control of the vehicle is carried out by the device. For this purpose, the device may access sensor signals such as acceleration, pressure, steering angle, or surroundings sensor signals, for example. The actuation takes place via actuators such as brake or steering actuators or an engine control unit of the vehicle.

A computer program product or computer program is also advantageous, having program code which may be stored on a machine-readable carrier or memory medium such as a semiconductor memory, a hard drive memory, or an optical memory and may be used to carry out, implement, and/or control the steps of the method according to one of the above-described specific embodiments, in particular if the program product or program is executed on a computer or a device.

Exemplary embodiments of the present invention are illustrated in the figures and explained in greater detail below.

DETAILED DESCRIPTION OF EXAMPLE EMBODIMENTS

Figure 1:
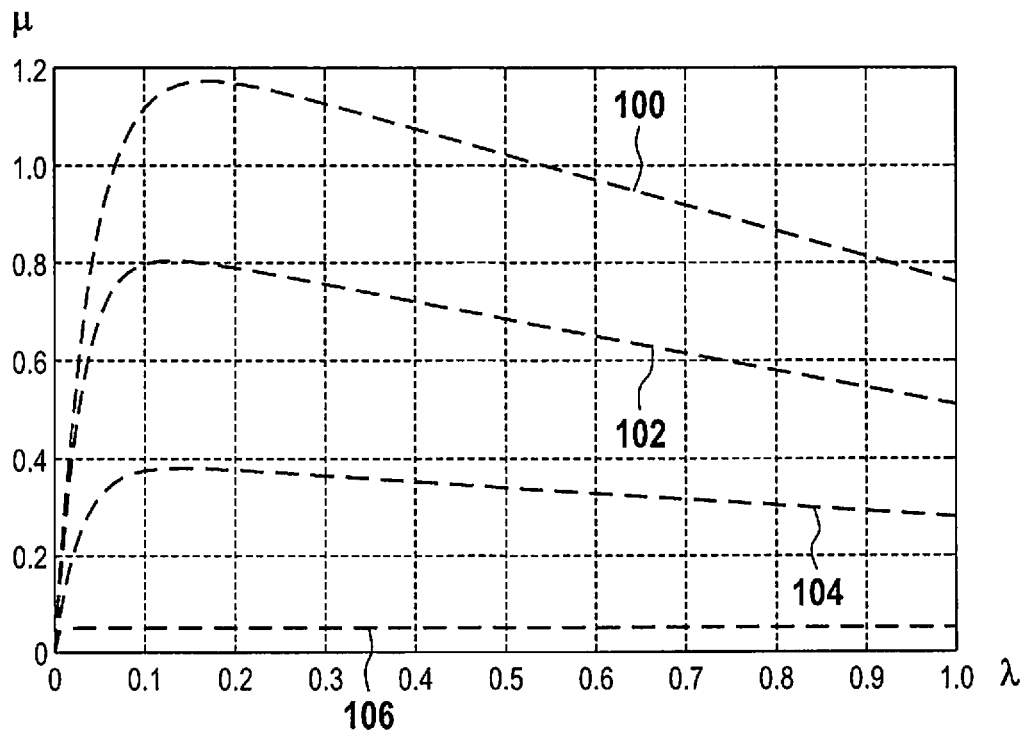
FIG. 1 shows a diagram to illustrate tire characteristic curves for use in a method according to one exemplary embodiment.

In the description below of advantageous exemplary embodiments of the present invention, identical or similar reference numerals are used for the elements which are shown in the various figures and act similarly, a repeated description of these elements being omitted.

FIG. 1 shows a diagram to illustrate tire characteristic curves 100, 102, 104, 106 for use in a method according to one exemplary embodiment. Four tire characteristic curves 100, 102, 104, 106 are shown by way of example, which are each based on a model function for the modeled representation of a dependence of a traction, represented by a friction coefficient μ plotted on a y axis, on a wheel slip λ plotted on an x axis. A first tire characteristic curve 100 for a great traction, a second tire characteristic curve 102 for a moderate traction, a third tire characteristic curve 104 for a traction on wet cobblestones, and a fourth tire characteristic curve 106 for a traction on wet ceramic paving are shown by way of example.

The foundation of the road state classification provided here is formed, for example, by a tire model, the initial parameterization of which is determined once from experiential measurement data, but is preferably provided by the tire manufacturer, and therefore the model or the parameterization is to be adapted accordingly if necessary in the event of a tire change.

An optimal linear parameterization of the so-called Burckhardt model is used as the tire model, for example, $$\mu(\lambda,\underline{c})=c_1(1-e^{-c_2\lambda})-c_3\lambda,$$

which describes the relationship between traction and wheel slip as follows:

$$\mu(\lambda,\underline{\omega})=\omega_1(1-e^{-8.105\lambda})+\omega_2(1-e^{-27.547\lambda})+\omega_3(1-e^{-75.012\lambda})-\omega_4\lambda,$$

μ standing for the traction,
λ standing for the wheel slip,
$c_1, c_2, c_3$ standing for the tire model parameters,
$\omega_1, \omega_2, \omega_3, \omega_4$ standing for the tire model parameters of the linearly parameterized model function.

In contrast to the original Burckhardt model having its parameters $c_i$ (i=1 (1)3), the linear parameterization offers the advantage that it is linear in all parameters $\omega_i$ (i=1 (1)4) and is therefore more suitable with respect to a real-time estimation of the model.

The estimations of traction μ and wheel slip λ are carried out, for example, in a model-based manner with the aid of the models stored in the ESP system and the existing ESP sensors.

Figure 2:
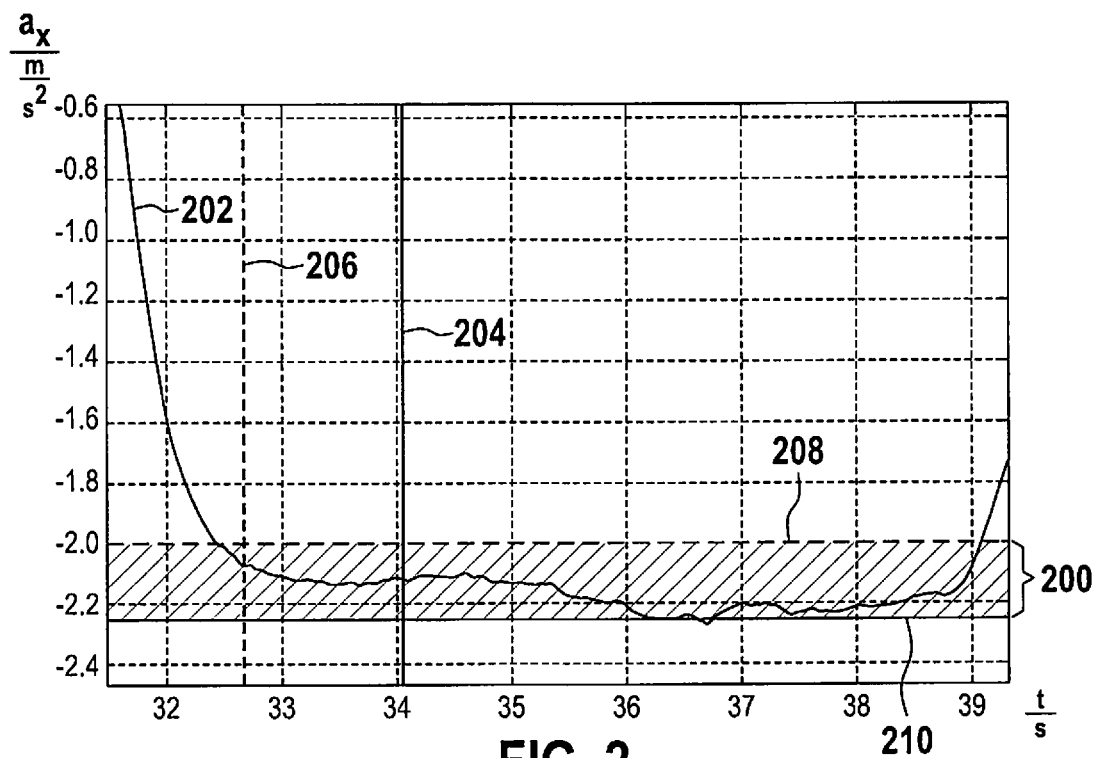
FIG. 2 shows a diagram to illustrate a tolerance band with respect to a vehicle acceleration to be taken into consideration when measuring a traction and a wheel slip.

FIG. 2 shows a diagram to illustrate by way of example a tolerance band 200 in relation to a vehicle acceleration $a_x$ to be taken into consideration when measuring a traction and a wheel slip. A curve 202 is shown, which represents a curve of acceleration $a_x$, plotted here in m/s² on a y axis, as a function of a time t in seconds. Two vertical lines 204, 206 identify a velocity range of the measurement, a first line 204 for representing a velocity of 50 km/h and a second line 206 representing a velocity of 60 km/h by way of example. Tolerance band 200 is delimited by two horizontal lines 208, 210, a first horizontal line 208 representing an upper threshold value of acceleration $a_x$ and a second horizontal line 210 representing a lower threshold value of acceleration $a_x$. The jerk, i.e., the change of the longitudinal deceleration from one to the next time step is also not to be ignored, notwithstanding the value range of the longitudinal deceleration. Dynamic buildup and dissipation phases of the deceleration are to be excluded from the estimation by delimiting this jerk.

The knowledge of when measurements of the variables traction and wheel slip may be used for an estimation of the road state is essential. On the one hand, a settled vehicle state is required during the braking maneuver or acceleration maneuver. In addition, the deceleration and accelerations, respectively, in the longitudinal direction are not to leave, in a time interval to be defined, a certain tolerance band. FIG. 2 shows such a tolerance band 200 by way of example. Vertical lines 204, 206 restrict an exemplary velocity range of 50 to 60 km/h, in which the evaluation is to take place.

The dependence of brake coefficient $c_p$ and thus of brake torque $M_b$, brake force $F_x$, and friction coefficient μ on the brake temperature ($\mu=f(F_x=f(M_b=f(c_p=f(temp.))))$) is to be taken into consideration insofar as the road state classification is suspended in the case of brake temperatures outside a tolerance range and is thus not available.

Figure 3:
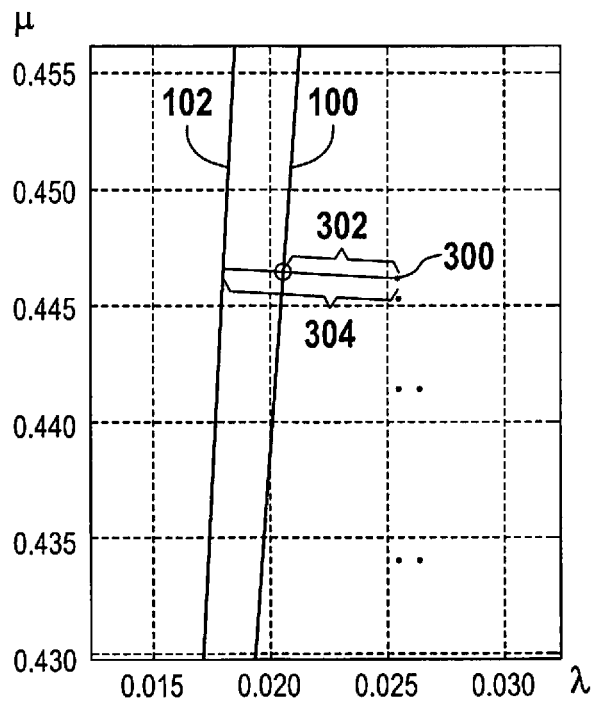
FIG. 3 shows a diagram to illustrate distances between a measurement coordinate and tire characteristic curves for use in a method according to one exemplary embodiment.

FIG. 3 shows a diagram to illustrate distances between a measurement coordinate 300 and tire characteristic curves 100, 102 for use in a method according to one exemplary embodiment. A first distance value representing a distance between measurement coordinate 300 and first tire characteristic curve 100 is identified by a line 302. In FIG. 3, the first distance value represents by way of example a perpendicular, i.e., least distance of measurement coordinate 300 to tire characteristic curve 100. Measurement coordinate 300 is to be understood as a value pair of measured values of the traction and the wheel slip or values derived therefrom. Moreover, second tire characteristic curve 102 is shown, the perpendicular distance of which to measurement coordinate 300 is identified by a further line 304. A length of further line 304 represents a second distance value in this case. In contrast to FIG. 1, first tire characteristic curve 100 represents the tire behavior of a tire on wet asphalt, while second tire characteristic curve 102 represents the behavior of a tire on dry asphalt. Measurement data with respect to the traction and the wheel slip are marked with small circles. Measurement coordinate 300, which represents a mean value formed using the measurement data here, is marked by a star.

The two distance values 302, 304 are compared to one another in the method to carry out a road state classification. For example, for this purpose the state of the roadway is identified as the state of wet asphalt if first distance value 302, as shown in FIG. 3, is less than second distance value 304. Vice versa, for example, the state of the roadway would be identified as the state of dry asphalt if second distance value 304 were less than first distance value 302.

The central point of the road state classification is to determine the perpendicular distance of a mean value represented by measurement coordinate 300 in the variables traction and wheel slip of a measurement in relation to the stored tire models in the form of tire characteristic curves 100, 102. It is possible by a comparison of the distances to the two curves, for example, to make a statement with respect to the probability with which the identified road state is present.

To be able to ensure the identification of the road state over a longer period, it is necessary to be able to access at any time a preferably realistic tire model on various road surfaces having high, moderate, or low traction potential. For this purpose, for example, possible aging processes or appearances of wear of the tires are tracked and the stored tire model is updated accordingly. Plausibility checks, for example, via a windshield wiper velocity and forecasts of weather services, are optionally used to identify present measurements for an update of the tire model.

A total least-squares method, abbreviated TLS, is used to update the stored tire models, for example, which, in contrast to the ordinary least-squares method, abbreviated OLS, takes into consideration both input variables, traction and wheel longitudinal slip, for the determination of an optimal approximation and thus minimizes the orthogonal distances between tire model and measurement data.

Figure 4:
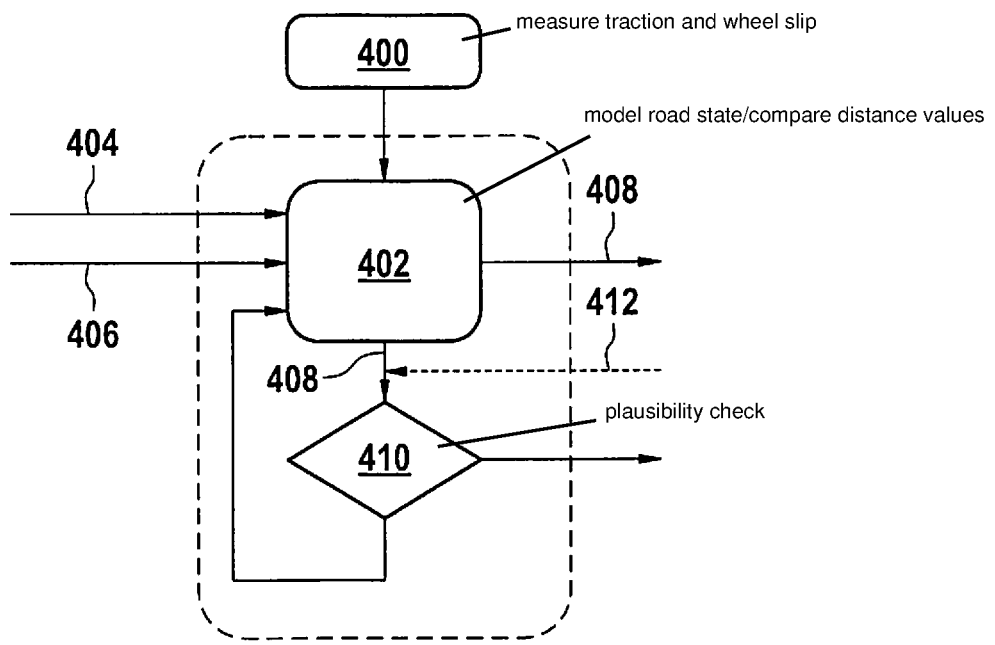
FIG. 4 shows a flow chart of process steps of a slip-based road state classification in a method according to one exemplary embodiment.

FIG. 4 shows a flow chart of process steps of a slip-based road state classification in a method according to one exemplary embodiment. The flow chart shown in FIG. 4 summarizes the process steps of a slip-based road state classification and illustrates the iterative character of the method. Iterative processes are framed by a dashed line. In a block 400, the measurement of the traction and the wheel slip takes place. A block 402 represents a model of the road state classification using data from the measurement in block 400, using tire models identified by an arrow 404, for example, in the form of the Burckhardt model or the magic tire formula, which correspond, for example, to the tire characteristic curves described above on the basis of FIGS. 1 and 3, and using initial base parameters, identified by a further arrow 406. In block 402, the various distance values between the measurement coordinates and the tire characteristic curves are compared to one another and an output signal 408 representing the state of the roadway is output as a function of a result of the comparison.

Optionally, in a block 410, a plausibility check of output signal 408 is carried out using at least one additional piece of information 412, for example, a piece of weather information or a windshield wiper velocity. If output signal 408 is accepted upon the plausibility check, an update of the present tire model parameters is thus carried out, for example, using plausibility-checked output signal 408, in block 402, the road state classification being carried out in future using the updated tire model parameters.

One example of an update of a tire model: The windshield wiper is switched on, the weather service reports rain, and wet asphalt is concluded as the road surface on the basis of the measurement of traction and wheel slip. In this case, the measurement is used as an update for the model of the "wet asphalt" curve.

The measurement of traction and wheel slip is carried out, for example, with the aid of the ESP sensor system. Output signal 408 represents, depending on the algorithm, the distance of the measurement coordinate to one of the stored tire characteristic curves or a probability of a certain road surface. With the aid of the classification made, for example, a maximum traction potential $\mu_{max}$ is optionally determined in a subsequent step. To determine the maximum, for example, the tire characteristic curve is used which has the least distance to the mean value of the present measurement.

Figure 5:
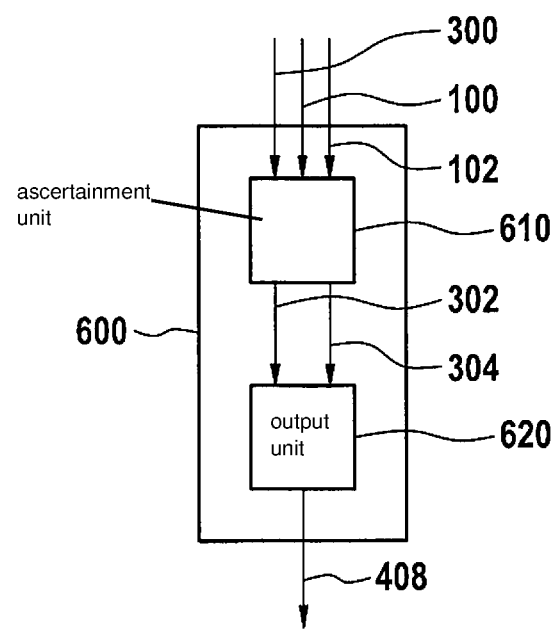
FIG. 5 shows a schematic illustration of a device according to one exemplary embodiment.

FIG. 5 shows a schematic illustration of a device 600 according to one exemplary embodiment. Device 600 for determining a state of a roadway of a vehicle includes an ascertainment unit 610, which is designed to ascertain a particular distance of measurement coordinate 300 to the two tire characteristic curves 100, 102 using measurement coordinate 300 and at least two tire characteristic curves, the two tire characteristic curves 100, 102 here. According to this exemplary embodiment, ascertainment unit 610 generates the two distance values 302, 304 as the result of the ascertainment and relays them to an output unit 620, which is designed to generate and output output signal 408 representing the state of the roadway using the two distance values 302, 304.

Figure 6:
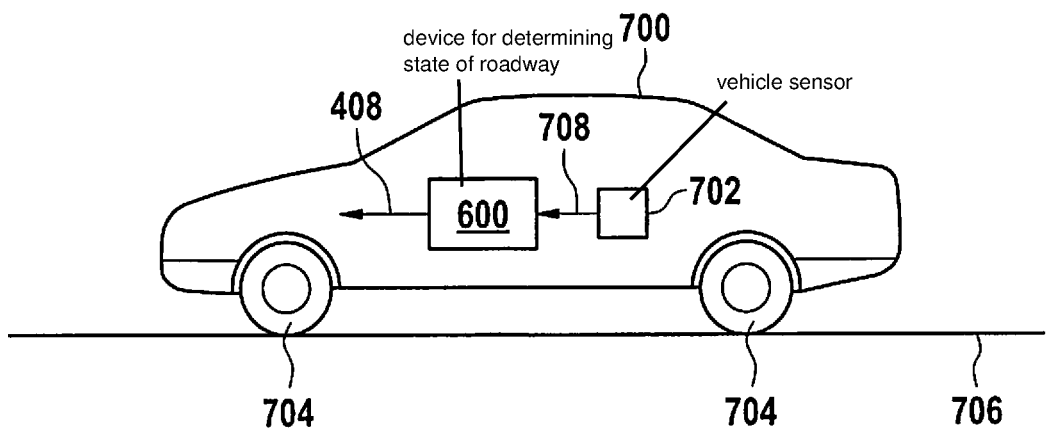
FIG. 6 shows a schematic illustration of a vehicle including a device according to one exemplary embodiment.

FIG. 6 shows a schematic illustration of a vehicle 700 including a device 600 according to one exemplary embodiment, such as the device described above on the basis of FIG. 5. Vehicle 700 includes a vehicle sensor 702, for example, an acceleration or surroundings sensor. Vehicle sensor 702 is designed to carry out measurements with respect to the traction between wheels 704 of vehicle 700 and a roadway 706 traveled by vehicle 700 and also with respect to the wheel slip of wheels 704 and to output a corresponding measurement signal 708, which represents the measurement coordinate described above on the basis of FIGS. 3 through 5, for example, to device 600. This device is designed to determine the state of roadway 706 using measurement signal 708 by outputting corresponding output signal 408.

Figure 7:
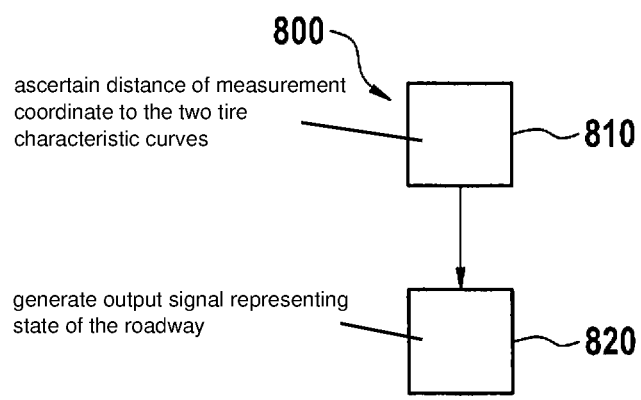
FIG. 7 shows a flow chart of a method according to one exemplary embodiment.

FIG. 7 shows a flow chart of a method 800 according to one exemplary embodiment. Method 800 for determining a state of a roadway of a vehicle may be carried out, for example, using a device described on the basis of FIGS. 5 and 6. In a step 810, the distance of the measurement coordinate to the two tire characteristic curves is ascertained. In a further step 820, the output signal representing the state of the roadway is generated using the results from step 810.

If an exemplary embodiment includes an "and/or" linkage between a first feature and a second feature, this is to be read to mean that the exemplary embodiment according to one specific embodiment includes both the first feature and the second feature and according to another specific embodiment includes only the first feature or only the second feature.

What is claimed is:

1. A method for determining a state of a roadway of a vehicle, the method comprising:
    ascertaining, via a processing unit, a distance of a measurement coordinate to a first tire characteristic curve associated with a first state of the roadway to generate a first distance value, and a second tire characteristic curve associated with a second state of the roadway to generate a second distance value, the measurement coordinate representing a result of a measurement carried out using at least one vehicle sensor of a presently utilized traction between wheels of the vehicle and the roadway and of a wheel slip of the wheels, and the first tire characteristic curve and the second tire characteristic curve being based on a model function for the modeled representation of the traction as a function of the wheel slip; and outputting, via a communication interface, an output signal representing the state of the roadway using the first distance value and the second distance value.

2. The method as recited in claim 1, wherein, in the ascertaining, a coordinate is used as the measurement coordinate which represents a mean value of measured values of the measurement and/or a wheel slip of at most 15%.

3. The method as recited in claim 1, wherein, in the ascertaining, a least distance of the measurement coordinate to the first tire characteristic curve is ascertained via the processing unit, to generate the first distance value, and/or a least distance of the measurement coordinate to the second tire characteristic curve is ascertained, via the processing unit, to generate the second distance value.

4. The method as recited in claim 1, wherein, in the outputting step, a signal representing the first state of the roadway is output, via the communication interface, as the output signal if the first distance value is less than the second distance value.

5. The method as recited in claim 1, further comprising:
determining, via the processing unit, a maximum value representing a maximum traction using the output signal, from the communication interface, in combination with the first tire characteristic curve and/or the second tire characteristic curve.

6. The method as recited in claim 1, further comprising:
checking a plausibility, via the processing unit, of the output signal using at least one additional piece of information relevant for the determination of the state of the roadway;
modifying, via the processing unit, as a function of a result of the plausibility checking, the first tire characteristic curve to form a modified first tire characteristic curve and/or the second tire characteristic curve to form a modified second tire characteristic curve.

7. The method as recited in claim 6, wherein the ascertaining, via the processing unit, is performed again to generate: (i) the first distance value by ascertaining a distance of the measurement coordinate to the modified first tire characteristic curve and/or (ii) the second distance value by ascertaining a distance of the measurement coordinate to the modified second tire characteristic curve.

8. The method as recited in claim 1, wherein, in the ascertaining, via the processing unit, a characteristic curve is used as the first tire characteristic curve and/or the second tire characteristic curve, which is based on a model function for the modeled representation of the traction as a function of tire model parameters and/or tire model parameters of the linearly parameterized model function of the wheels.

9. The method as recited in claim 8, wherein, in the ascertaining, via the processing unit, a characteristic curve is used as the first tire characteristic curve and/or the second tire characteristic curve, which represents a linear parameterization of the following model function:

$$\mu(\lambda, \underline{c}) = c_1(1 - e^{-c_2\lambda}) - c_3\lambda,$$

$\mu$ standing for the traction,
$\lambda$ standing for the wheel slip,
$c_1$, $c_2$, $c_3$ standing for the tire model parameters.

10. The method as recited in claim 8, wherein, in the ascertaining, via the processing unit, a characteristic curve is used as the first tire characteristic curve and/or the second tire characteristic curve, which represents a model function linearly parameterized using the following function:

$$\mu(\lambda, \underline{\omega}) = \omega_1(1 - e^{-8.105\lambda}) + \omega_2(1 - e^{-27.547\lambda}) + \omega_3(1 - e^{-75.012\lambda}) - \omega_4\lambda,$$

$\mu$ standing for the traction,
$\lambda$ standing for the wheel slip,
$\omega_1$, $\omega_2$, $\omega_3$, $\omega_4$ standing for the tire model parameters of the linearly parameterized model function.

11. The method as recited in claim 1, wherein, in the ascertaining, via the processing unit, a distance of the measurement coordinate to at least one further tire characteristic curve associated with a further state of the roadway and based on the model function is ascertained in order to generate at least one further distance value, and, in the outputting, the output signal is output, via the communication interface, using the further distance value.

12. A device for determining a state of a roadway of a vehicle, comprising:
a processing unit to ascertain a distance of a measurement coordinate to a first tire characteristic curve associated with a first state of the roadway to generate a first distance value, and a second tire characteristic curve associated with a second state of the roadway to generate a second distance value, the measurement coordinate representing a result of a measurement carried out using at least one vehicle sensor of a presently utilized traction between wheels of the vehicle and the roadway and of a wheel slip of the wheels, and the first tire characteristic curve and the second tire characteristic curve being based on a model function for the modeled representation of the traction as a function of the wheel slip; and
a communication interface to output an output signal representing the state of the roadway using the first distance value and the second distance value.

13. A non-transitory machine-readable memory medium on which is stored a computer program, which is executable by a processing unit, comprising:
a program code arrangement having program code for determining a state of a roadway of a vehicle, by performing the following:
ascertaining, via the processing unit, a distance of a measurement coordinate to a first tire characteristic curve associated with a first state of the roadway to generate a first distance value, and a second tire characteristic curve associated with a second state of the roadway to generate a second distance value, the measurement coordinate representing a result of a measurement carried out using at least one vehicle sensor of a presently utilized traction between wheels of the vehicle and the roadway and of a wheel slip of the wheels, and the first tire characteristic curve and the second tire characteristic curve being based on a model function for the modeled representation of the traction as a function of the wheel slip; and
outputting, via a communication interface, an output signal representing the state of the roadway using the first distance value and the second distance value.

* * * * *